United States Patent Office 3,639,323
Patented Feb. 1, 1972

3,639,323
PREBLENDING OF ETHYLENE-PROPYLENE RUBBER AND WAX FOR INCORPORATION IN HIGHLY UNSATURATED RUBBER
Gerrard Morrisey, Watertown, Conn., assignor to Uniroyal, Inc., New York, N.Y.
No Drawing. Filed July 17, 1969, Ser. No. 842,686
Int. Cl. C08c 11/70
U.S. Cl. 260—28.5 B     6 Claims

ABSTRACT OF THE DISCLOSURE

The incorporation of ethylene-propylene rubber (EPM or EPDM) and wax into highly unsaturated rubber (e.g., NR, SBR) is accomplished more readily if the ethylene-propylene rubber and wax are first preblended before mixing into the highly unsaturated rubber. Use of the ethylene-propylene rubber and wax in the form of a preblend also results in improved distribution of these additives in the highly unsaturated rubber, and improved ozone resistance in the total blend.

---

This invention relates to a method of incorporating ethylene-propylene rubber and wax into a highly unsaturated rubber, and to a preblend of ethylene-propylene rubber and wax useful in such method, as well as to the product resulting from such method.

It is known to those skilled in the art that the addition of ethylene-propylene rubber and/or wax to highly unsaturated rubber improves considerably the ozone resistance and weatherability of the highly unsaturated rubber ("Blends of Royalene With Other Rubbers," M. S. Sutton, Rubber World, February 1964, pp. 62–68; U.S. Pat. 3,356,764, Gentile, Dec. 5, 1967; U.S. Pat. 3,443,619, Kindle, May 13, 1969).

Unfortunately, difficulties have been encountered in prior practice due to bleeding of wax (bloom) on the surface of the rubber article, leading to reduction of adhesion and discoloration of the article. The removal of the wax from the surface with a suitable solvent is time consuming and costly.

Furthermore, mixing of ethylene-propylene rubber and wax into highly unsaturated rubber is a time consuming operation because the wax reduces the shearing effect in the conventionally used mixers or mills.

It is an object of the invention to facilitate the incorporation of ethylene-propylene elastomer and wax into highly unsaturated rubber. The method of the invention is capable of improving the ozone resistance of the highly unsaturated polymer, in comparison to similar compounding recipes mixed in accordance with conventional practice. The reason for the improvement is believed to be a better distribution of the wax and ethylene-propylene rubber particles throughout the highly unsaturated rubber. The mixture made by the method of the invention also mitigates difficulties experienced from bloom formation in prior practice.

In accordance with the invention, the ethylene-propylene elastomer and wax are first preblended, before incorporating them into the highly unsaturated rubber. It has been found in accordance with the invention that preblending the ethylene-propylene rubber and wax greatly facilitates the incorporation of the ethylene-propylene rubber and wax into the highly unsaturated elastomer, so that the mixing can be accomplished in a shorter time and a more uniform distribution of the additives is achieved.

The ethylene-propylene rubbers ("EPR") employed in the invention include not only the saturated ethylene-propylene binary copolymer ("EPM"), but also the unsaturated ternary copolymers of ethylene, propylene and a copolymerizable non-conjugated diene ("EPDM"), especially a bridged ring diene such as dicyclopentadiene, methylene norbornene, ethylidene norbornene, butenyl norbornene, or other cyclic polymer such as tetrahydroindenes, methyl- or ethyl-norbornadiene and the like, as well as such open-chain diolefins as 1,4-hexadiene. The ethylene to propylene weight ratio may range from 20:80 to 80:20, the preferred range being from 70:30 to 40:60. The diene, if used, usually amounts to from about 3 to 20% by weight of the terpolymer. (Production of non-halogenated terpolymer of this character, in which the monomers are randomly distributed, with the aid of soluble catalyst, is disclosed in British Pat. 1,014,874, United States Rubber Co., Dec. 31, 1965.)

Any type of wax that is sufficiently compatible with the ethylene-propylene elastomer may be employed in the invention. Animal waxes are suitable, such as spermaceti, beeswax, Chinese wax and the like. Also suitable are the vegetable waxes, such as carnauba, Japan, bayberry, candelilla and the like. Mineral waxes are also suitable, such as ozocerite, montan, ceresin, paraffin and the like. Also suitable are synthetic waxes such as medium weight polyethylene, polyethylene glycols or polypropylene glycols, chloronaphthalenes, sorbitols, chlorotrifluoroethylene resins, and the like. The wax used may be of micro or macro crystalline structure, or blends of such waxes may be used. The preferred waxes are petoleum waxes of the paraffinic type and of microcrystalline structure (such waxes are of course non-halogenated).

Preblending of the elastomeric ethylene-propylene polymer and the wax may be accomplished by the use of an internal type mixer, such as a Banbury, or an open mill (dry mixing), but the preblending may also be accomplished by solution blending. The latter method is of significant economic importance because EPM's and EPDM's are usually prepared by the action of an anionic coordination catalyst of the Ziegler-Natta type in the presence of an inert solvent. Thus, since the EPM or EPDM as prepared is already in a solution state (usually with a solids content from about 2 to 20%), the addition of wax to the polymer may be accomplished very easily. The recovery of the resulting polymer-wax preblend from the solution may proceed without any significant changes in the normal work-up procedure, as compared to conventional recovery of the polymer alone.

In order to speed up the rate of blending, the wax may also be pre-dissolved in a suitable solvent, which is preferably the same solvent as used for preparing the polymer, although this is not essential.

The proportions of ethylene-propylene rubber and wax in the preblend may vary from about 15% to about 45% by weight of wax and correspondingly from about 85% to about 55% by weight of ethylene-propylene rubber. Preferably the preblend of the invention contains about 20–33% wax, the correspondingly 80–67% ethylene-propylene rubber.

The highly unsaturated rubbers, into which the ethylene-propylene rubber/wax preblend is incorporated in accordance with the invention, may be defined as diene polymer rubbers. This category includes not only the homopolymers of the conjugated diolefins, such as polybutadiene (whether solution-prepared or emulsion-prepared; of high cis content or otherwise) and polyisoprene (whether natural or synthetic; solution prepared or otherwise), but also the copolymer rubbers containing at least 50% of such diolefin copolymerized with a monoethylenically unsaturated copolymerizable monomer, as exemplified by styrene, acrylonitrile, vinyl pyridine, ethyl acrylate, etc.

The amount of ethylene-propylene copolymer/wax preblend incorporated into the highly unsaturated rubber usually amounts to from 2 to 40% by weight, and is preferably from 10 to 25% by weight, based on the weight of the highly unsaturated rubber. Mixing of the preblend with the highly unsaturated rubber may be accomplished in an internal mixer or on an open mill. The mixing of the preblend and highly unsaturated rubber is characterized by unusually rapid incorporation of the preblend into the highly unsaturated rubber, in comparison to the difficulty experienced if it is attempted to add the ethylene-propylene rubber and wax as separate ingredients without preblending. Without preblending, the wax simply tends to act as a lubricant, reducing the shearing effect of the mixing, and impairing the efficiency of mixing.

The blends of highly unsaturated polymers with preblended ethylene propylene elastomers and wax prepared in accordance with the invention are useful in many applications such as pneumatic tire sidewalls and coverstrips, heater hoses, weather stripping, shoe soles and general footwear, window seals, and also sponge products made from blown rubber. Reduced tendency of the wax to bloom, and improved resistance to ozone and weathering, are advantages displayed by articles made from the compositions mixed in accordance with the invention.

The following examples, in which all quantities are expressed by weight unless otherwise indicated, will serve to illustrate the practice of the invention in more detail.

EXAMPLE 1

Into a 15 gallon capacity tank equipped with an agitator is charged 46.5 pounds of a 9% EPDM solution in hexane. The EPDM contains 94% of ethylene and propylene with an ethylene to propylene weight ratio of 65 to 35 and 6% dicyclopentadiene. 18.5 grams of epoxidized soybean oil of an average molecular weight of 1000 and an epoxide content of about 5%, and 18.5 grams of trinonylphenyl phosphite (an antioxidant) are added and stirred for 10 minutes at room temperature. Then 2.2 pounds of wax dissolved in 2.5 gallons of hexane is charged to the EPDM solution and agitated for 15 minutes. The wax is a paraffinic microcrystalline wax blend with a specific gravity of .91 at 25° C. and a softening point of 64° C. (commercially available material known as "Sunproof Improved"). The EPDM-wax preblend is recovered from the solution by dispersing the solution in superheated water and spraying the dispersion through an atomizing nozzle with steam, as described in U.S. Patent 3,437,645, Paige et al., Apr. 8, 1969. The preblend is pre-dried by feeding it through an extrusion dryer and finally dried at 170° F. or a tray in a circulating air oven. The Mooney viscosity of the EPDM-wax preblend is 15, as compared to a Mooney of 51 of the original EPDM itself (ML–4 at 212° F.). The ratio of EPDM to wax in the preblend is about 2:1 by weight.

EXAMPLE 2

Three pounds of Sunproof Improved wax dissolved in 4 gallons of hexane is added at room temperature to 130.5 pounds of a 9.2% hexane solution of the same EPDM terpolymer as in Example 1. The two solutions blend immediately, without precipitation even after standing without agitation for 4 days. The EPDM-wax blend (15 pounds) is recovered and dried as in Example 1. The polymer to wax ratio is 4:1.

EXAMPLE 3

The improved ease of incorporation of an EPDM-wax preblend (B) over simultaneous addition of EPDM and wax (A) into natural rubber is demonstrated in this example. The time required to produce smooth and uniform blends is measured. The EPDM and wax employed are the same as in Example 1. The natural rubber in both cases, A and B, is first banded for four minutes before addition of other ingredients is made. The following recipes are employed:

|  | Grams | |
|---|---|---|
|  | A | B |
| Natural rubber | 600 | 600 |
| EPDM | 60 | |
| Wax | 30 | |
| EPDM-wax (2:1 ratio) preblended in Banbury | | 90 |
| Total | 690 | 690 |

SCHEDULE OF MIXING FOR A

Natural rubber—at 0 minutes
EPDM and wax separately—at 4 minutes
Sheeted off—at 9½ minutes

SCHEDULE OF MIXING FOR B

Natural rubber—at 0 minutes
EPDM-wax preblend—at 4 minutes
Sheeted off—at 6½ minutes

EXAMPLE 4

Black stocks are prepared in a Banbury mixer using the recipes listed below. The EPDM and wax are the same as those used in Example 1. Stock A contains only the SBR, with no EPDM or wax. Stock B contains SBR and wax, but no EPDM. Stock C contains SBR, and EPDM and wax added separately in accordance with prior art practice, instead as a preblend in accordance with the invention. Stock D contains SBR and EPDM, and, in addition, a preblend of EPDM and wax (2:1 ratio) prepared in the Banbury mixer. Stock E represents the preferred practice of the invention, and utilizes the EPDM-wax solution preblend of Example 1.

|  | A | B | C | D | E |
|---|---|---|---|---|---|
| SBR 1500 | 100 | 100 | 80 | 80 | 80 |
| EPDM |  |  | 20 | 10 | 10 |
| Banbury preblend (EPDM: wax 2:1) |  |  |  | 15 |  |
| Solution preblend (EPDM: wax 2:1) |  |  |  |  | 15 |
| Wax |  | 5 | 5 |  |  |
| Zinc oxide | 5 | 5 | 5 | 5 | 5 |
| Stearic acid | 1 | 1 | 1 | 1 | 1 |
| HAF black | 50 | 50 | 50 | 50 | 50 |
| Extender oil (highly aromatic type; Philrich No. 5) | 10 | 10 | 10 | 10 | 10 |
| N-cyclohexyl-2-benzothiazole sulfenamide | 1.75 | 1.75 | 1.75 | 1.75 | 1.75 |
| Sulfur | 2 | 2 | 2 | 2 | 2 |
| Octamine | 1 | 1 | 1 | 1 | 1 |

The above compounded stocks are cured for 30 minutes at 320° F. and then exposed to ozone concentration of 50 p.p.h.m. in a bent loop test in an ozone box. The figures in the following table indicate the time in hours required to produce the indicated degree of cracking.

| Degree of cracking | A | B | C | D | E |
|---|---|---|---|---|---|
| Trace |  | 2 | 2 | 2 | 2 |
| Slight | 2 | 24 | 144 | 144 | 144 |
| Some | 4 |  |  |  | 648 |
| Cracked | 6 | 144 | 648 | 648 | 816 |

It is desired to emphasize that Stock C is much more difficult to mix (requires a significantly longer mixing time for proper mixing) than Stock D of the invention. The results with Stock E are noteworthy as illustrating an embodiment of the invention capable of providing unusually enhanced ozone-resistance.

Having thus described my invention what I claim and desire to protect by Letters Patent is:

1. In a method of incorporating non-halogenated elastomeric ethylene-propylene-non-conjugated diene terpolymer rubber and non-halogenated microcrystalline petroleum paraffin wax into a highly unsaturated rubber, the improvement comprising first blending said wax and terpolymer in solution to make a preblend of said additives, thereafter recovering the resulting preblend of additives from the solution, and subsequently incorporating said preblend into the highly unsaturated rubber, whereby the said additives are incorporated into the highly unsaturated rubber faster than if said additives were added separately to the highly unsaturated rubber, and whereby more uniform distribution of said additives in said highly unsaturated rubber and improved ozone resistance in the total blend, compared to a total blend made by separately adding said additives to the highly unsaturated rubber, are obtained, the amount of said elastomeric terpolymer rubber in the preblend being from 85 to 55% by weight and the amount of wax correspondingly from 15 to 45%, and the amount of said preblend being from 2 to 40% by weight of the highly unsaturated rubber, the weight ratio of ethylene to propylene in the terpolymer being from 20:80 to 80:20 and the amount of said diene being from 3 to 20% by weight of the terpolymer.

2. A method as in claim 1 in which the amount of said terpolymer rubber is from 67 to 80% by weight, and the amount of wax is correspondingly from 33 to 20% by weight, the weight ratio of ethylene to propylene in the terpolymer being from 70:30 to 40.60.

3. A method as in claim 2 in which said copolymerizable non-conjugated diene is dicyclopentadiene.

4. A method as in claim 2 in which said copolymerizable non-conjugated diene is ethylidene norbornene.

5. A method as in claim 2 in which the said highly unsaturated rubber is natural rubber.

6. A method as in claim 2 in which said highly unsaturated rubber is SBR.

References Cited

UNITED STATES PATENTS

| | | | |
|---|---|---|---|
| 2,894,926 | 7/1959 | Jacobson | 260—28.5 B |
| 3,112,285 | 11/1963 | Phelan | 260—28.5 B |
| 3,356,764 | 12/1967 | Gentile | 260—889 |
| 3,443,619 | 5/1969 | Kindle | 260—889 |
| 3,496,125 | 2/1970 | Boyer | 260—889 |
| 3,505,190 | 4/1970 | Morrissey | 260—889 |

OTHER REFERENCES

Rubber World, "Materials and Compounding Ingredients for Rubber," 1968 edition, p. 156.

MORRIS LIEBMAN, Primary Examiner

P. R. MICHL, Assistant Examiner

U.S. Cl. X.R.

260—889